UNITED STATES PATENT OFFICE.

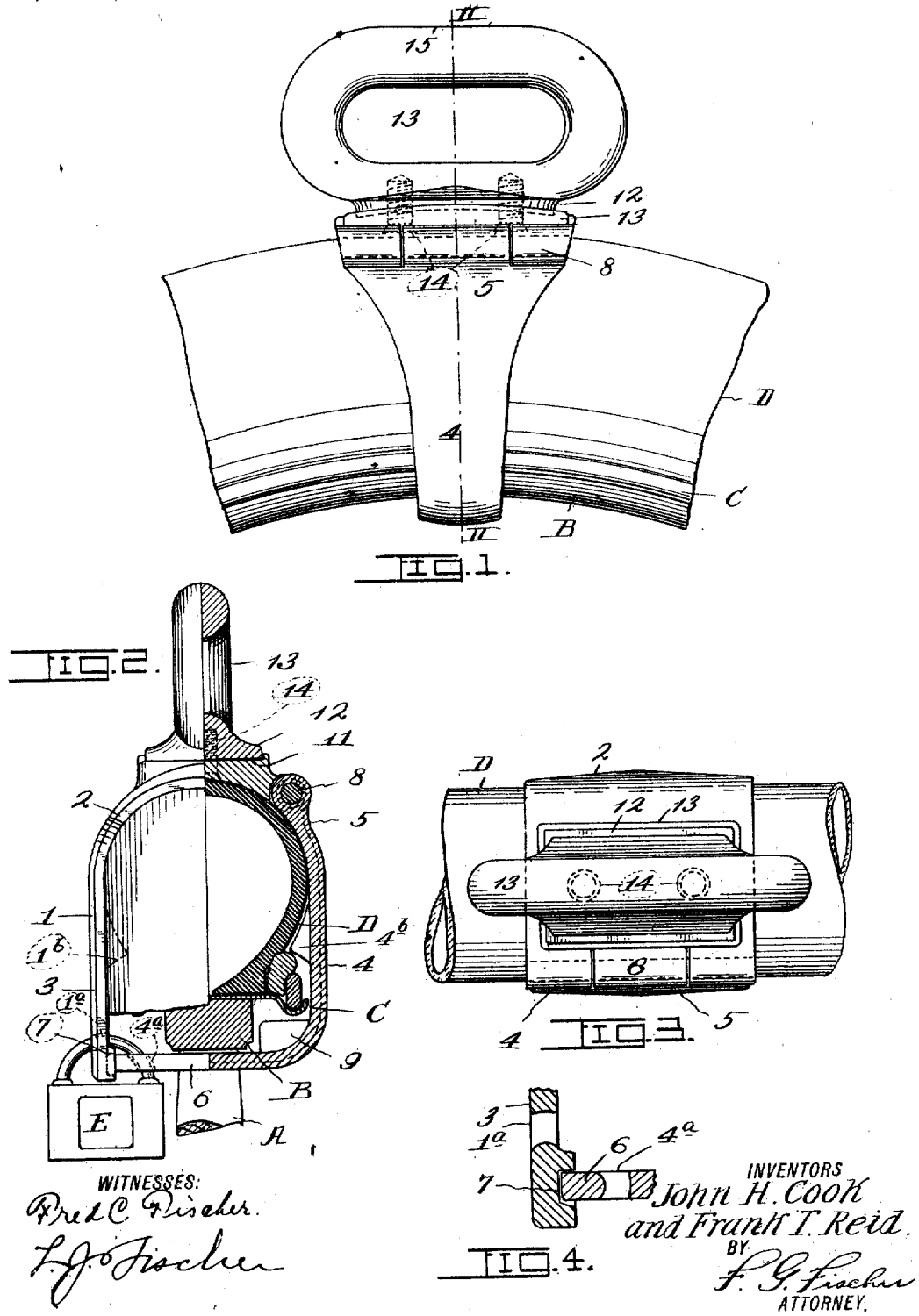

JOHN H. COOK AND FRANK T. REID, OF KANSAS CITY, MISSOURI.

AUTOMOBILE-WHEEL CUFF.

1,204,847.  Specification of Letters Patent.  Patented Nov. 14, 1916.

Application filed November 29, 1915. Serial No. 63,994.

*To all whom it may concern:*

Be it known that we, JOHN H. COOK and FRANK T. REID, citizens of the United States, residing at Kansas City, in the county of Jackson and State of Missouri, have invented certain new and useful Improvements in Automobile-Wheel Cuffs, of which the following is a specification.

Our invention relates to a new and useful device adapted to be applied to one or more wheels of an automobile to prevent theft of either the machine or its tires.

A still further object is to provide a device extremely simple in construction, inexpensive to manufacture, and one which will be very efficient in operation.

With these and other objects in view, our invention consists in novel features of construction, combination and arrangement of parts as will be hereinafter referred to and more particularly pointed out in the claim.

In the accompanying drawing: Figure 1 is a broken side elevation of an automobile wheel with our device applied thereto. Fig. 2 is a combination front elevation and vertical section on line II—II of Fig. 1. Fig. 3 is a plan view of the parts disclosed by Fig. 1. Fig. 4 is a broken section of two parts of the device.

Referring now to the different parts, A designates the spokes, B a felly, C the rim, and D the tire of an automobile wheel.

In constructing our invention, we employ a member 1, consisting of a wide curved portion 2 and a tapered straight portion 3. The wide portion 2 snugly fits the cross sectional curvature of the tire D, while the straight portion 3 extends close to the side of the rim C.

4 designates a latch consisting of a wide portion 5 and a tapered portion 6, which is bent at right angles to pass beneath the felly B and enter a recess 7 in the reduced terminal of the member 1. The wide portions of the member 1 and the latch 4 are connected by a hinge 8, while the free ends of the members 1 and 4 have slots 1ª and 4ª, respectively, to receive the hasp of a padlock E, whereby said free ends are reliably secured together. On referring to Fig. 1 it will be seen that the member 1 and the latch 4, when applied to a wheel, snugly fit the cross sectional curvature of the tire D and come so close to the sides of the rim C and the underside of the felly B, as to prevent lateral displacement of the device. As a further safe-guard against lateral displacement of the device, we provide the latch 4 with a lug 9 which extends into close relation with the underside of the rim C and the adjacent side of the felly B. Lugs 1ᵇ and 4ᵇ are also formed on the member 1 and the latch 4, respectively, to lie close to the sides of the tire D to prevent the device from turning on the tire.

The upper enlarged portion 2 of the member 1, has a socket 11 to receive the base 12 of an elongated loop 13, firmly secured in said socket 11 by two screws 14, which extend through the member 1 and into the lower portion of the loop 13. When the device is applied to a wheel the screws are concealed, hence access cannot be had thereto for the purpose of removing the loop 13. The loop 13 in addition to acting as a handle for the device when removed from the wheel, is of such proportions as to project considerably beyond the tread of the wheel when applied thereto, so as to constitute a chock to prevent rotation of the wheel. However, should the automobile be sufficiently high powered to cause the wheel to climb upon the loop 13, the elongated surface 15 thereof will skid along the surface of the pavement and prevent the wheel from rotating. In the event, however, that the wheel should rotate, its motion will be so irregular as to attract attention to the car before a thief can escape therewith. In addition to preventing the automobile from being stolen, it also acts as a lock for the tire or tires around which it is placed, so that they cannot be removed from the rims of the wheels.

The device is made so substantial that it cannot be broken with a hammer without attracting the attention of persons passing by.

From the foregoing description it is apparent that we have produced a simple and inexpensive device which is well adapted to the purpose intended, and while we have shown and described the preferred form of our device, we reserve the right to make such changes in the construction, combination and proportion of parts as properly fall within the spirit and scope of the claim.

Having thus described our invention, what we claim and desire to secure by Letters Patent, is:

A device of the character described, consisting of two members having wide portions and tapered portions and one of which is bent to abut the other member, a pintle operably connecting said members so that they may be placed around the tire and the felly of a wheel, a socket in one member, a loop provided with a base adapted to fit into said socket, means accessible only from the side of the member adapted to be placed next to the tire for removably-securing said base in the socket, lugs on the pintle-connected members to prevent the device from being rotated on the tire and the felly, and a lock to secure the abutting portions of said pintle-connected members.

In testimony whereof we affix our signatures, in the presence of two witnesses.

JOHN H. COOK.
FRANK T. REID.

Witnesses:
F. G. FISCHER,
L. J. FISCHER.